United States Patent
Jung et al.

(10) Patent No.: US 9,234,114 B2
(45) Date of Patent: Jan. 12, 2016

(54) RESIN COMPOSITION FOR PAINT AND COATING FILM USING THE SAME

(71) Applicants: Hyundai Motor Company, Seoul (KR); Kia Motors Corporation, Seoul (KR)

(72) Inventors: Woo Chul Jung, Incheon (KR); Namjin Kim, Chungcheongbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/331,550

(22) Filed: Jul. 15, 2014

(65) Prior Publication Data

US 2015/0166817 A1 Jun. 18, 2015

(30) Foreign Application Priority Data

Dec. 12, 2013 (KR) .................. 10-2013-0154966

(51) Int. Cl.
| | |
|---|---|
| *C09D 133/12* | (2006.01) |
| *C09D 7/12* | (2006.01) |
| *C09D 167/02* | (2006.01) |
| *C08L 1/02* | (2006.01) |

(52) U.S. Cl.
CPC ............ *C09D 133/12* (2013.01); *C09D 167/02* (2013.01); *C08L 1/02* (2013.01)

(58) Field of Classification Search
CPC .......................... C09D 133/12; C09D 167/02
See application file for complete search history.

(56) References Cited

FOREIGN PATENT DOCUMENTS

| | | | | |
|---|---|---|---|---|
| JP | 2002-348526 A | 12/2002 | | |
| KR | 10-2006-0041807 A | 5/2006 | | |
| KR | 1020060041807 A | * 5/2006 | ........... | C09D 175/02 |
| KR | 10-2010-0016071 A | 2/2010 | | |

* cited by examiner

*Primary Examiner* — Robert Harlan
(74) *Attorney, Agent, or Firm* — Mintz Levin Cohn Ferris Glovsky and Popeo, P.C.; Peter F. Corless

(57) ABSTRACT

A resin composition for paint and a film manufactured using the resin composition are provided. The composition includes an acrylic resin in an amount of about 10 to about 40 wt %, a cellulose-based resin in an amount of about 1 to about 10 wt %, a polyester resin in an amount of about 1 to about 30 wt %, and a balance amount of a solvent. A weight-average molecular weight of the acrylic resin is in a range from about 1,000 to about 4,000 g/mol.

15 Claims, 1 Drawing Sheet

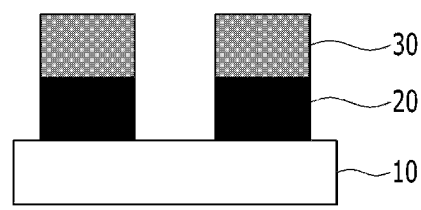

RESIN COMPOSITION FOR PAINT AND COATING FILM USING THE SAME

CROSS-REFERENCE TO RELATED APPLICATION

This application claims priority to and the benefit of Korean Patent Application No. 10-2013-0154966 filed in the Korean Intellectual Property Office on Dec. 12, 2013, the entire contents of which are incorporated herein by reference.

TECHNICAL FIELD

The present invention relates to a resin composition for paint and a coating film using the resin composition.

BACKGROUND

Many control switches or buttons for a vehicle interior part, such as an audio, an air conditioner, and the like, have been used in vehicles today. The switches or buttons are frequently touched by a user and thus, abrasion resistance and chemical resistance may be required. In order to provide the abrasion resistance and the chemical resistance, a paint having low gloss, improved surface hardness, and abrasion resistance has been widely used. However, this non-glossy paint may be easily damaged by a scratch on the surface and have an inferior surface texture. Accordingly, defects caused by touching by a hand during operation may remain. In related arts, a matting agent may be added to the paint to maintain a low gloss degree but may be lost by a surface scratch, thereby causing a surface damage and defects due to difference in partial surface gloss.

The above information disclosed in this Background section is only for enhancement of understanding of the background of the invention and therefore it may contain information that does not form the prior art that is already known in this country to a person of ordinary skill in the art.

SUMMARY

The present invention provides a resin composition for paint which may maintain abrasion resistance and low gloss and may have improved surface touch and scratch resistance. In addition, a coating film manufactured using the resin composition for paint is provided.

In an exemplary embodiment, a resin composition for paint may include: an acrylic resin in an amount of about 10 to about 40 wt %; a cellulose-based resin in an amount of about 1 to about 10 wt %; a polyester resin in an amount of about 1 to about 30 wt %; and a balance amount of a solvent, based on the total amount of the resin composition for paint. In particular, a weight-average molecular weight of the acrylic resin may be in a range from about 1,000 to about 4,000 g/mol, and a glass transition temperature (Tg) of the acrylic resin may be in a range from about 2 to about 15° C.

In an exemplary embodiment, the cellulose-based resin may be selected from the group consisting of cellulose acetate butyrate, cellulose acetate, and a combination thereof. In addition, a weight-average molecular weight of the polyester resin may be in a range from about 2,500 to about 20,000 g/mol, and a glass transition temperature (Tg) thereof may be in a range from about 10 to about 50° C.

The resin composition for paint may further include a plasticizer which may be selected from the group consisting of acetyltributylcitrate, acetyltriethylcitrate, acetyltripropylcitrate, and a combination thereof, and the plasticizer may be included in an amount of about 1 to about 10 wt % based on the total amount of the resin composition for paint. The resin composition for paint may further include carbon black, and the carbon black may be included in an amount of about 1 to about 5 wt % based on the total amount of the resin composition for paint. Further, the resin composition for paint may further include a pigment which may be selected from the group consisting of an azo-based pigment, an azo lake-based pigment, a perinone-based pigment, and a combination thereof. The pigment may be included in an amount of about 0.1 to about 1 wt % based on the total amount of the resin composition for paint.

Additionally, the resin composition for paint may further include a matting agent which may be selected from the group consisting of amorphous silica, nano silica, ethylene-based wax, and a combination thereof. The matting agent may be included in an amount of about 0.1 to about 5 wt % based on the total amount of the resin composition for paint. The resin composition for paint may further include an additive including a propene polymer, polyethylene, a dispersing agent, a surface controlling agent, a wetting and dispersing agent, an antifoaming agent, a slip agent, or a combination thereof, and the additive may be included in an amount of about 0.1 to about 10 wt % based on the total amount of the resin composition for paint.

In another aspect of the present invention, a coating film manufactured by using the resin composition for paint is provided.

A resin composition for paint which may have improved abrasion resistance and low gloss and improved surface touch and scratch resistance is provided herein and thus, may be applied to various products, for example, a film for a vehicle interior part.

BRIEF DESCRIPTION OF THE DRAWING

The above and other objects, features and advantages of the present invention will be more clearly understood from the following detailed description taken in conjunction with the accompanying drawing.

FIG. 1 shows an exemplary cross-sectional view of an exemplary vehicle interior part manufactured by a film according to an exemplary embodiment of the present invention.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, embodiments are described in various exemplary embodiments. However, these embodiments are exemplary, and this disclosure is not limited thereto. According to an exemplary embodiment, a resin composition for paint may include an acrylic resin, a cellulose-based resin, a polyester resin, and a solvent. The acrylic resin, as used herein, may have excellent chemical resistance, abrasion resistance, and surface hardness. Accordingly, the acrylic resin may provide improved durability when applied to a vehicle interior part, for example, a button, which may be frequently touched by a hand among other vehicle interior parts.

In an exemplary embodiment, the acrylic resin may have a weight-average molecular weight in a range from about 1,000 to about 4,000 g/mol, from about 1,000 to about 3,000 g/mol, or particularly from about 1,500 to about 2,000 g/mol. When the acrylic resin has a average molecular weight within the range, improved texture and touch on the surface of a film in addition to improved chemical resistance, abrasion resistance, and scratch resistance, may be accomplished. In addition, the acrylic resin may have a glass transition temperature (Tg) in a range from about 2 to about 15° C., or particularly, from about 5 to about 10° C. When the acrylic resin has a glass transition temperature within the range, improved surface texture may be obtained and stickiness on the surface of a film may be minimized.

The acrylic resin may be prepared by polymerizing an acryl-based monomer of methylacrylate, ethylacrylate, propylacrylate, butylacrylate, methylmethacrylate, ethylmethacrylate, propylmethacrylate, butylmethacrylate, and the like, without limitation. The acrylic resin may be included in an amount of about 10 to about 40 wt %, or particularly, of about 25 to about 35 wt % based on the total amount of the resin composition for paint. When the amount of acrylic resin is included within the content range, improved texture and touch on the surface of a film, in addition to improved chemical resistance, abrasion resistance, and scratch resistance, may be accomplished.

The cellulose-based resin, as used herein, may work as an auxiliary resin for the acrylic resin and secure dispersion of the post-described pigment, additive, and the like and improve cross-linking density of the surface of a film. In an exemplary embodiment, the cellulose-based resin may have a weight-average molecular weight in a range from about 10,000 to about 70,000 g/mol, from about 20,000 to about 30,000 g/mol, or particularly from about 25,000 to about 30,000 g/mol. The cellulose-based resin may be selected from the group consisting of cellulose acetate butyrate, cellulose acetate and a combination thereof. In addition, the cellulose-based resin may be included in an amount of about 1 to about 10 wt %, or particularly, of about 1 to about 5 wt % based on the total amount of the resin composition for paint. When the amount of cellulose-based resin is included within the content range, improved chemical resistance, abrasion resistance and scratch resistance may be obtained, and dispersion of a pigment and an additive may be improved.

The polyester resin, as used herein, along with the acrylic resin may provide excellent touch on the surface of a film. In an exemplary embodiment, the polyester resin may have a weight-average molecular weight in a range from about 2,500 to about 20,000 g/mol, or particularly, from about 5,000 to about 10,000 g/mol. When the polyester resin has a weight-average molecular weight within the range, improved chemical resistance and abrasion resistance may be obtained and stickiness on the surface of a film may be minimized. In addition, the polyester resin may have a glass transition temperature (Tg) in a range from about 10 to about 50° C., or particularly, from about 20 to about 40° C. When the polyester resin has a glass transition temperature within the range, improved surface texture may be obtained and stickiness of the surface of a film may be minimized.

Moreover, the polyester resin may be produced through a condensation reaction of, but not limited to, an alcohol compound of diethylene glycol, methylpropanediol, and the like with an acidic compound, such as adipic acid, isophthalic acid, and the like. The polyester resin may be included in an amount of about 1 to about 30 wt %, or particularly, of about 1 to about 10 wt % based on the total amount of the resin composition for paint. When the amount of polyester resin is included within the content range, improved chemical resistance, abrasion resistance and scratch resistance, in addition to improved texture and touch on the surface of a film, may be obtained.

In an exemplary embodiment, the resin composition for paint may further include a plasticizer. Particularly, the plasticizer may be selected from the group consisting of acetyltributylcitrate, acetyltriethylcitrate, acetyltripropylcitrate, and a combination thereof. The plasticizer may reduce surface hardness of a film and provide improved touch. The plasticizer may be included in an amount of about 1 to about 10 wt %, or particularly, of about 1 to about 5 wt % based on the total amount of the resin composition for paint. When the amount of plasticizer is included within the content range, improved touch of the surface of a film, in addition to improved abrasion resistance, may be obtained.

In an exemplary embodiment, the resin composition for paint may further include carbon black. The carbon black may be added to the resin composition for paint and may provide an improved color and improved laser cutting after a film is formed. The carbon black may have a size ranging from about 0.2 to about 60 μm, or particularly, of about 10 to about 40 μm. When the carbon black has a size within the range, excellent laser cutting as well as an excellent color is realized. In addition, the carbon black may be included in an amount of about 1 to about 5 wt %, or particularly, of about 2 to about 3 wt % based on the total amount of the resin composition for paint. When the carbon black is included within the content range, a film may be prevented from being blackened by improving color realization and laser cutting, and thus, enhanced optical properties of the film may be obtained.

In an exemplary embodiment, the resin composition for paint may further include a pigment. The pigment may include various color pigments depending on a paint color, for example, an azo-based pigment, an azo lake-based pigment, a perinone-based pigment, or a combination thereof but is not limited thereto. The pigment may be included in an amount of about 0.1 to about 1 wt %, or particularly, of about 0.1 to about 0.5 wt % based on the total amount of the resin composition for paint. When the pigment is included within the content range, a color may be easily realized.

In an exemplary embodiment, the resin composition for paint may further include a matting agent. The matting agent may be selected from the group consisting of amorphous silica, nano silica, ethylene-based wax and a combination thereof. For example, the amorphous silica has a non-crystalline structure and thus, an excellent absorption rate and water resistance. The matting agent may be included in an amount of about 0.1 to about 5 wt %, or particularly, of about 0.1 to about 1.5 wt % based on the total amount of the resin composition for paint. When the matting agent is included within the content range, a film may maintain excellent scratch resistance as well as a low surface gloss.

In an exemplary embodiment, the resin composition for paint may include an additive. The additive may include a propene polymer, polyethylene, a dispersing agent, a surface controlling agent, wetting and dispersing agent, an antifoaming agent, a slip agent, or a combination thereof. The additive may be included in an amount of about 0.1 to about 10 wt %, or particularly, of about 0.1 to about 5 wt % based on the total amount of the resin composition for paint. When the amount of additive is included within the content range, properties of a film may be improved.

In an exemplary embodiment, the solvent included in the resin composition for paint may be, but not be limited to, an ester based solvent, a ketone-based solvent, or a mixture thereof. The ester based solvent may include, but not be limited to, N-butyl acetate, isobutyl acetate, and the like; and the ketone-based solvent may include, but not be limited to, methylethylketone, methylisobutylketone, and the like. The solvents may be used as a single solvent or as a mixture of two or more, but is not limited thereto. The solvent may be included in a balance amount, or particularly, in an amount of about 40 to about 60 wt % based on the total amount of the resin composition for paint. When the amount of solvent is included within the content range, dissolution and inflow properties of the resin composition for paint may be improved.

In various exemplary embodiments, the above resin composition for paint may be used to form a coating film. This film may be applied to a button member for a vehicle interior part, such as an audio, an air conditioner, and the like.

FIG. 1 shows an exemplary cross-sectional view of an exemplary vehicle interior part manufactured by applying a coating film according to an exemplary embodiment of the present invention. In FIG. 1, an exemplary vehicle interior part, or particularly, an exemplary button member may be manufactured by painting a shield primer on a polycarbonate resin layer 10 to form a shield primer layer 20, performing a clear painting by using a resin composition for paint according to an exemplary embodiment of the present invention on the shield primer layer 20 to form a coating film 30, and then, laser-cutting it.

The coating film manufactured from the above resin composition for paint may have improved surface touch and scratch resistance while maintaining abrasion resistance and low gloss.

Hereinafter, various exemplary embodiments are illustrated in more detail with reference to examples. These examples, however, should not in any sense be interpreted as limiting the scope of the present invention. Furthermore, what is not described in this disclosure may be sufficiently understood by those who have knowledge in this field and will not be illustrated here.

Examples 1 and 2 and Comparative Examples 1 to 6

Resin compositions for paint were prepared by mixing the components in Table 1.

(A) Acrylic Resin (A-1) Polymethylmethacrylate having a weight-average molecular weight of 1,700 g/mol and a glass transition temperature of 8° C. was used.

(A-2) Polymethylmethacrylate having a weight-average molecular weight of 10,000 g/mol and a glass transition temperature of 28° C. was used.

(B) Cellulose-Based Resin

Cellulose acetate butyrate having a weight-average molecular weight of 65,000 g/mol (Sigma-Aldrich Co., Ltd., USA) was used.

(C) Polyester Resin

Polyethyleneterephthalate having a weight-average molecular weight of 8,000 g/mol and a glass transition temperature of 22° C. (SK Chemicals, South Korea) was used.

(D) Plasticizer

Acetyltributylcitrate was used.

(E) Carbon Black

Carbon black having a size of 0.8 μm was used.

(F) Pigment

C.I. pigment blue 15 (CAS. 147-14-8) was used.

(G) Matting Agent

Amorphous silica (Syloid®, W. R. Grace & Co., USA) was used.

(H) Additive (H-1) A propene polymer having a weight-average molecular weight of 500 g/mol was used.

(H-2) Polyethylene having a weight-average molecular weight of 50,000 g/mol was used.

(H-3) A dispersing agent (BYK 348, BYK Chemical. Co., Germany) was used.

(H-4) A surface adjuster (BYK 333, BYK Chemical. Co., Germany) was used.

(I) Solvent

Isobutyl acetate and methylethylketone were mixed in a volume ratio of 6:4.

TABLE 1

| | | (unit: wt %) | | | | | | | |
|---|---|---|---|---|---|---|---|---|---|
| | | Examples | | Comparative Examples | | | | | |
| | | 1 | 2 | 1 | 2 | 3 | 4 | 5 | 6 |
| (A) acrylic resin | (A-1) | 25 | 30 | 30 | — | 10 | 15 | 33 | 30 |
| | (A-2) | — | — | — | 30 | — | — | — | — |
| (B) cellulose-based resin | | 2 | 1 | 2 | — | 5 | 10 | — | — |
| (C) polyester resin | | 5 | 1 | — | — | 15 | 10 | — | 2 |
| (D) plasticizer | | 1 | 1 | 1 | 1 | 3 | 3 | — | 1 |
| (E) carbon black | | 2 | 2 | 2 | 2 | 2 | 2 | 2 | 2 |

TABLE 1-continued (unit: wt %)

|  |  | Examples | | Comparative Examples | | | | | |
|---|---|---|---|---|---|---|---|---|---|
|  |  | 1 | 2 | 1 | 2 | 3 | 4 | 5 | 6 |
| (F) pigment | | 0.5 | 0.5 | 0.5 | 0.5 | 0.5 | 0.5 | 0.5 | 0.5 |
| (G) matting agent | | 5 | 5 | 5 | 5 | 5 | 5 | 5 | 5 |
| (H) additive | (H-1) | 0.5 | 0.5 | 0.5 | 0.5 | 0.5 | 0.5 | 0.5 | 0.5 |
|  | (H-2) | 0.5 | 0.5 | 0.5 | 0.5 | 0.5 | 0.5 | 0.5 | 0.5 |
|  | (H-3) | 0.5 | 0.5 | 0.5 | 0.5 | 0.5 | 0.5 | 0.5 | 0.5 |
|  | (H-4) | 0.5 | 0.5 | 0.5 | 0.5 | 0.5 | 0.5 | 0.5 | 0.5 |
| (I) solvent | | 57.5 | 57.5 | 57.5 | 57.5 | 57.5 | 57.5 | 57.5 | 57.5 |

Evaluation 1: Properties of Film

The resin compositions for paint according to Examples 1 and 2 and Comparative Examples 1 to 6 were respectively coated to be about 20 μm thick after a shield primer (Musashi 330, Japan) was coated on a polycarbonate material and then, dried at about 80° C. for about 40 minutes, thereby forming each film. Properties of the films were measured in the following method, and the results are provided in Table 2.

(1) Touch: Recovery degree of the films was measured after pushing the films down on the surface with a fingernail for 3 seconds. Herein, the evaluation is presented with following references.

⊚: recovery within 1 hour
○: recovery within 6 hours
X: no recovery (2) Abrasion Resistance: Exposure of a plastic substrate and damage of a film were examined after moving back and forth a double-sided sailcloth friction material for about 10,000 times with a test load of about 1 kgf at a speed of about 30 times/min under a friction stroke of about 100 mm using a typical abrasion tester.

(3) Scratch Resistance: The surface of the films was scratched with a sapphire tip under a load of about 0.5 kgf and a stroke of about 100±5 mm at a speed of about 100 mm/sec according to standard JIS K 6718 method. Herein, the evaluation is presented with following references.

⊚: no surface damage
○: minor scratch but not seen with naked eyes
Δ: minor scratch but seen with naked eyes
X: scratch easily seen with naked eyes (4) Heat Resistance and Light Resistance: Heat resistance was evaluated by allowing films to stand in about 80° C. chamber for about 300 hours, and light resistance was evaluated by exposing the films to a light source of about 84 MJ/cm² using a CI4000 equipment. Herein, the evaluation is presented with the following references.

⊚: no discolor and no film damage after a checkerboard grid evaluation
○: minor discolor and minor peeling off at the end after a checkerboard grid evaluation
Δ: discolor and peeling one grid after a checkerboard grid evaluation
X: discolor and peeling five grids after a checkerboard grid evaluation

TABLE 2

|  | Examples | | Comparative Examples | | | | | |
|---|---|---|---|---|---|---|---|---|
|  | 1 | 2 | 1 | 2 | 3 | 4 | 5 | 6 |
| Touch | ⊚ | ○ | Δ | X | ○ | ○ | ○ | X |
| Abrasion resistance | No change | No change | No change | No change | film peeling | film peeling | No change | No change |
| Scratch resistance | ⊚ | ⊚ | Δ | Δ | X | X | ○ | Δ |
| Heat resistance and light resistance | ⊚ | ⊚ | ⊚ | ⊚ | Δ | Δ | X | ○ |

In Tables 1 and 2, Examples 1 and 2 using the resin compositions for paint according to an exemplary embodiment of the present invention may obtain improved surface touch and slip and also, excellent abrasion resistance and scratch resistance compared to Comparative Examples 1 to 6. In particular, Comparative Examples 3 and 4 using an acrylic resin in substantially small amount may have reduced surface hardness and durability and deteriorate abrasion resistance and scratch resistance. Moreover, Comparative Example 5 using only an acrylic resin may deteriorate painting workability due to reduced dispersion and workability of the resin.

While this disclosure has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resin composition for paint, comprising: an acrylic resin in an amount of about 10 to about 40 wt %; a cellulose-based resin in an amount of about 1 to about 10 wt %; a polyester resin in an amount of about 1 to about 30 wt %; and a balance amount of a solvent, based on the total amount of the resin composition for paint, wherein a weight-average molecular weight of the acrylic resin is in a range from about 1,000 to about 4,000 g/mol,
wherein a glass transition temperature (Tg) of the acrylic resin is in a range from about 2 to about 15° C.

2. The resin composition for paint of claim 1, wherein the cellulose-based resin is selected from the group consisting of: cellulose acetate butyrate, cellulose acetate, and a combination thereof.

3. The resin composition for paint of claim 1, wherein a weight-average molecular weight of the polyester resin is in a range from about 2,500 to about 20,000 g/mol.

4. The resin composition for paint of claim 1, wherein a glass transition temperature (Tg) of the polyester resin is in a range from about 10 to about 50° C.

5. The resin composition for paint of claim 1, wherein the resin composition for paint further comprises: a plasticizer selected from the group consisting of: acetyltributylcitrate, acetyltriethylcitrate, acetyltripropylcitrate, and a combination thereof.

6. The resin composition for paint of claim 5, wherein the plasticizer is included in an amount of about 1 to about 10 wt % based on the total amount of the resin composition for paint.

7. The resin composition for paint of claim 1, wherein the resin composition for paint further comprises carbon black.

8. The resin composition for paint of claim 7, wherein the carbon black is included in an amount of about 1 to about 5 wt % based on the total amount of the resin composition for paint.

9. The resin composition for paint of claim 1, wherein the resin composition for paint further comprises: a pigment selected from the group consisting of: an azo-based pigment, an azo lake-based pigment, a perinone-based pigment, and a combination thereof.

10. The resin composition for paint of claim 9, wherein the pigment is included in an amount of about 0.1 to about 1 wt % based on the total amount of the resin composition for paint.

11. The resin composition for paint of claim 1, wherein the resin composition for paint further comprises: a matting agent selected from the group consisting of: amorphous silica, nano silica, ethylene-based wax, and a combination thereof.

12. The resin composition for paint of claim 11, wherein the matting agent is included in an amount of about 0.1 to about 5 wt % based on the total amount of the resin composition for paint.

13. The resin composition for paint of claim 1, wherein the resin composition for paint further comprises: an additive which includes a propene polymer, polyethylene, a dispersing agent, a surface controlling agent, a wetting and dispersing agent, an antifoaming agent, a slip agent, or a combination thereof.

14. The resin composition for paint of claim 13, wherein the additive is included in an amount of about 0.1 to about 10 wt % based on the total amount of the resin composition for paint.

15. A coating film manufactured using the resin composition for paint of claim 1.

* * * * *